B. ROBINSON.
APPARATUS FOR CURING AND DRYING FISH.
No. 48,723. Patented July 11, 1865.
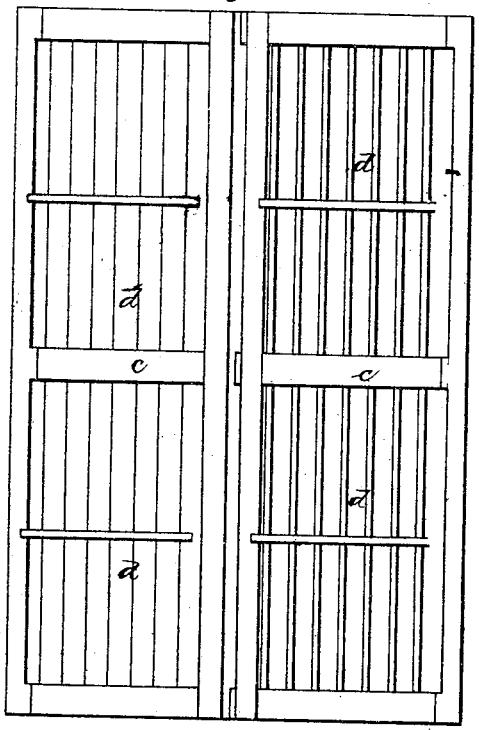
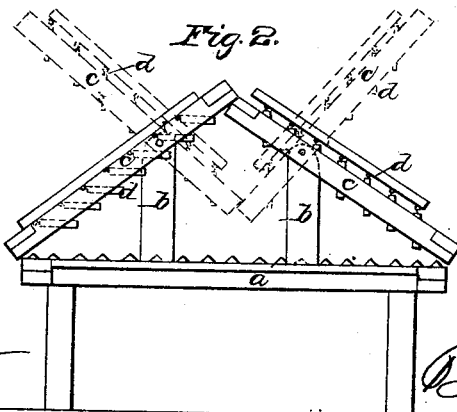

UNITED STATES PATENT OFFICE.

BENJAMIN ROBINSON, OF EAST GLOUCESTER, MASSACHUSETTS.

IMPROVED APPARATUS FOR CURING AND DRYING FISH.

Specification forming part of Letters Patent No. 48,723, dated July 11, 1865.

*To all whom it may concern:*

Be it known that I, BENJAMIN ROBINSON, of East Gloucester, Essex county, in the State of Massachusetts, have invented an Improvement in Fish-Flakes; and I do hereby declare that the following, taken in connection with the drawings which accompany and form part of this specification, is a description of my invention sufficient to enable those skilled in the art to practice it.

In the common and well-known process of curing fish by drying, as practiced in this country, it is customary to expose the fish upon open frames, called "flakes," supported horizontally on posts about three feet from the surface of the ground. In very warm and sunny days, or when the temperature suddenly becomes hot, the fish so exposed are liable to become spoiled, there being no provision for shielding them from the direct rays of the sun. Moreover, it is customary to collect the fish and remove them to the fish or store house every night during the drying process to preserve them from the effects of dew and of rain.

The object of my invention is to afford a means of sheltering or screening the fish upon the flakes, so as to protect them, when necessary, from the too direct rays of the sun, and to avoid, if desirable, the labor incurred in the daily removal of the fish from the flakes to the fish-house.

The invention consists in combining with the flake-frame upon which the fish are laid screens or slatted frames so constructed and arranged that the fish may be wholly protected from the weather, or may be more or less screened from the rays of the sun, as circumstances may require.

The drawings represent a fish-flake embodying the invention, Figure 1 showing a plan view, and Fig. 2 an end view, of the same.

*a* denotes the ordinary flake-frame, constructed and supported in the usual manner. *b b* are standards or posts erected at each end of said frame, to which are hinged shelter-frames *c c*, provided with movable or swinging slats *d*, capable of being opened or closed, as will be readily understood.

The shelter-frame *c* may be turned up into the position seen in red lines in Fig. 2, and in this position the slats may be opened to allow the sun to strike through the frame upon the fish, or may be wholly or partially closed to shut off the rays of the sun; or the frames may be turned down, as seen by the black lines in said figure, and in this position the slats may be more or less opened, or, being closed, may be used as a roof to protect the fish spread upon the flakes.

It will be obvious that all danger of blistering, scalding, or spoiling the fish is obviated by the employment of an adjustable screen of this nature, having provision for modifying the amount of sunlight directed upon the surface of the flake-frame.

I claim—

The combination, with a fish-flake, of a screening-frame arranged to operate substantially as and for the purpose set forth.

In witness whereof I have hereunto set my hand this 6th day of June, A. D. 1865.

BENJ. ROBINSON.

Witnesses:
 F. GOULD,
 W. B. GLEASON.